(12) United States Patent
Ludwig et al.

(10) Patent No.: US 10,376,931 B2
(45) Date of Patent: Aug. 13, 2019

(54) GEL FOR REMOVING GRAFFITI AND METHOD FOR REMOVING GRAFFITI USING SAID GEL

(71) Applicant: COMMISSARIAT A L'ENERGIE ATOMIQUE ET AUX ENERGIES ALTERNATIVES, Paris (FR)

(72) Inventors: Amelie Ludwig, Salon de Provence (FR); Frederic Goettmann, Courthezon (FR); Fabien Frances, Rousson (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 15/518,891

(22) PCT Filed: Oct. 14, 2015

(86) PCT No.: PCT/EP2015/073807
§ 371 (c)(1),
(2) Date: Apr. 13, 2017

(87) PCT Pub. No.: WO2016/059125
PCT Pub. Date: Apr. 21, 2016

(65) Prior Publication Data
US 2017/0239694 A1    Aug. 24, 2017

(30) Foreign Application Priority Data

Oct. 15, 2014 (FR) .................................. 14 59884

(51) Int. Cl.
*B08B 3/08* (2006.01)
*C09D 9/00* (2006.01)
*B08B 1/00* (2006.01)

(52) U.S. Cl.
CPC ............... *B08B 3/08* (2013.01); *B08B 1/002* (2013.01); *C09D 9/005* (2013.01)

(58) Field of Classification Search
CPC ............ B08B 3/08; B08B 1/002; C09D 9/005
See application file for complete search history.

(56) References Cited

U.S. PATENT DOCUMENTS

| 6,057,276 | A | 5/2000 | Smith |
| 7,713,357 | B2 | 5/2010 | Faure et al. |
| 7,718,010 | B2 | 5/2010 | Faure et al. |
| 8,636,848 | B2 | 1/2014 | Faure et al. |
| 2004/0175505 | A1 | 9/2004 | Faure et al. |
| 2006/0032518 | A1 | 2/2006 | Faure et al. |

(Continued)

FOREIGN PATENT DOCUMENTS

| BE | 1014037 A3 | 4/1999 |
| DE | 19527582 A1 | 7/1995 |

(Continued)

*Primary Examiner* — Sharidan Carrillo
(74) *Attorney, Agent, or Firm* — Pearne & Gordon LLP

(57) ABSTRACT

The invention relates to a gel for removing a graffiti from a surface of a solid substrate, consisting of a colloidal solution comprising an inorganic viscosifying agent, at least one solvent, optionally at least one surfactant, and optionally at least one dye and/or pigment. The invention also relates to a method for removing a graffiti from a surface of a solid substrate, wherein the gel is applied to said surface.

19 Claims, 7 Drawing Sheets

A

B

(56) References Cited

U.S. PATENT DOCUMENTS

| | | |
|---|---|---|
| 2007/0181166 A1 | 8/2007 | Noth |
| 2008/0228022 A1 | 9/2008 | Faure et al. |
| 2011/0229424 A1* | 9/2011 | Schumann ............... A61K 8/06 424/62 |
| 2012/0085371 A1* | 4/2012 | Schumann ............. C11D 1/825 134/26 |
| 2013/0171024 A1 | 7/2013 | Cuer et al. |
| 2014/0274855 A1 | 9/2014 | Schumann et al. |
| 2016/0050911 A1 | 2/2016 | Ludwig et al. |
| 2017/0239694 A1* | 8/2017 | Ludwig .................. C09D 9/005 |

FOREIGN PATENT DOCUMENTS

| | | |
|---|---|---|
| EP | 2045320 A1 | 9/2007 |
| FR | 2683541 A1 | 11/1991 |
| FR | 2737218 A | 7/1995 |
| FR | 2827530 A1 | 1/2003 |
| FR | 2891470 A1 | 4/2007 |
| FR | 3003763 A1 | 10/2014 |
| GB | 1487737 A1 | 10/1997 |
| WO | 9909134 A1 | 2/1999 |
| WO | 03008529 A1 | 1/2003 |
| WO | 2012001046 A1 | 1/2012 |
| WO | 2014154818 A1 | 10/2014 |
| WO | 2016059125 A1 | 4/2016 |

\* cited by examiner

GEL FOR REMOVING GRAFFITI AND METHOD FOR REMOVING GRAFFITI USING SAID GEL

CROSS-REFERENCE TO RELATED APPLICATIONS

This application is a U.S. national phase under the provisions of 35 U.S.C. § 371 of International Patent Application No. PCT/EP15/73807 filed Oct. 14, 2015, which in turn claims priority of French Patent Application No. 1459884 filed Oct. 15, 2014. The disclosures of such international patent application and French priority patent application are hereby incorporated herein by reference in their respective entireties, for all purposes.

TECHNICAL FIELD

The subject of the present invention is the use of a gel to remove a graffiti, also called a tag, on a surface of a solid substrate.

The gel of the invention can be termed a suctionable gel.

The present invention further relates to a method to remove a graffiti on a surface of a solid substrate using this gel.

The technical field of the invention can be defined as the treatment of surfaces that are polluted, soiled, deteriorated by tags, graffitis, with a view to the removal of said graffitis from these surfaces and in particular to improve the visual appearance of these surfaces.

The invention can be applied to all kinds of surfaces such as organic polymers surfaces e.g. made of plastic materials; surfaces made of glassy materials; surfaces made of cementitious materials such as cements, pastes, mortars and concretes; surfaces made of raw earth or baked earth; brick or tiled surfaces; surfaces made of plaster; ceramic surfaces; surfaces made of natural or artificial stone; surfaces made of coat; glass fibres surfaces; fibrocement surfaces; asphalt or tar surfaces; metal or metal alloy surfaces e.g. made of steel, of galvanised steel or of zinc; and surfaces made of cellulose based materials such as wood. These surfaces may or may not be painted.

These surfaces may or may not be porous.

The invention particularly applies to the removal of graffitis on external surfaces, located outdoors, of buildings, constructions, and pieces of art or civil engineering structures.

However, the invention can also be applied to the removal of graffitis from internal or external surfaces of aquatic vessels such as boats; of land vehicles such as cars, trucks, motorcycles, trains, subway carriages, coaches and buses; of aircrafts such as aeroplanes, helicopters or seaplanes (flying boats); of pieces of indoor or outdoor furniture such as pieces of street furniture or seats of public transport vehicles, etc.

It is to be noted that there is no limitation as to the surface on which graffiti may be found that are removed according to the invention.

STATE OF THE PRIOR ART

For several years, the combat against the proliferation of graffitis also known as tags has been an increasing concern for numerous public authorities and private companies, in numerous countries.

Aside from the deterioration of property such as buildings, street furniture, trains . . . that they cause, the presence of graffitis may also damage the image of a town, a district or a company through the feeling of insecurity that it generates. This type of vandalism therefore has a strong social and economic impact.

These graffitis especially cause a serious problem when they cover buildings and more particularly monuments, which are very often made of stone, brick and other porous materials. It is very difficult to remove graffitis from said porous materials, and a priceless cultural heritage may therefore be irreversibly damaged.

It is therefore necessary to be able to treat materials vandalised by tags, both preventively and curatively, without deteriorating these materials and in a reactive manner to prevent new attacks and to prevent the paint from interacting and combining with air pollution which would make cleaning operations more difficult.

For this purpose, there exist different treatment techniques. A distinction can be made between preventive techniques and curative techniques.

Preventive techniques essentially comprise the application of sacrificial, semi-permanent or permanent films which provide the surface with protection and/or facilitate paint removal.

Among curative techniques, mention can be made of spraying water under high pressure, sand-blasting, application of paint to tagged surfaces covered with graffitis, the removal of graffitis using stripping agents such as solvents or alkalis, or by laser irradiation.

All these treatment techniques require an extensive, trained, qualified labour force in particular for the application of protective films, the operation and maintenance of high pressure or laser equipment, the handling of chemical products which means that anti-graffiti operations are very costly.

Some of these treatment techniques use gels.

For example, document DE-A1-195 27 582 [1] concerns a method to remove graffiti applied with spray can paint, whereby the paint is dissolved with a gel comprising aniseed essential oil, sweet inula essential oil, glycerine, and silica.

The gel in this document is not a gel that can be termed a suctionable gel. In addition, the gel in this document has a dissolving action on the graffiti, which then has to be removed by an additional operation of washing type.

Document FR-A1-2 683 541 [2] concerns a cleaner for painted surfaces soiled by graffiti, which may be in gel form, and which comprises one or more solvents selected from among butanol, isopropanol, ethanol, butyrolactone, cyclohexanone, N-methyl-pyrrolidone, dimethylformamide, butyl acetate, ethylglycol acetate, ethoxypropyl acetate and butylglycol, one or more powerful oxidants and 1 to 10% by weight of a substance capable of forming a gel such as bentonites, silicas and cellulose derivatives.

The gel of this document is not a gel that can be termed a suctionable gel, it comprises powerful oxidants likely to damage surfaces and it appears to have low efficiency.

In addition, in this document, there is no description of the method used to apply or use the gel.

Document FR-A-2 737 218 [3] describes a cleaning composition in gel form to remove chewing gum and graffitis which comprises a carbon-containing solvent, a gelling agent, a polar solvent and optionally a miscibility agent.

The gelling agent may be in particular finely divided silicon dioxide, the solvent may be ethanol and the carbon-containing solvent is selected from among C, E, F, and A. petrols.

The gel of this document has the major drawback that it contains a carbon-containing solvent selected from among carcinogenic compounds.

In addition, the gel of this document does not appear to be a gel that can be termed a suctionable gel, and it appears to have low efficiency.

Also, the application mode of the composition of this document on gums and graffiti is not specified. In particular, in this document it is not sought specifically to obtain a gel that can be sprayed.

Document BE-A3-1014037 [4] concerns a method to remove graffitis, wherein the soiled surface is sprayed with a gel comprising a mixture of carbon-containing solvents of a polar solvent and of a gelling agent, and the gel is left to dry.

A compound acting in the gaseous state such as dry ice or pressurised dry water vapour is then sprayed onto the surface where the dry gel is located, and the surface is generally rinsed.

The gelling agent may be in particular finely divided silicon dioxide, and the mixture of carbon-based solvents is selected from among C, E, F and A petrols.

The gel of this document has the disadvantage that it contains a carbon-containing solvent selected from among toxic, carcinogenic compounds which are therefore a hazard for operators.

The gel of this document does not appear to be a gel that can be termed a suctionable gel, and on this account the method of this document comprises a final rinsing step which produces large amounts of liquid effluents.

Document US-A1-2007/0181166 [5] concerns a method to remove graffiti which uses a viscous gel consisting of a mixture of various solvents and surfactants e.g. a mixture of N-methyl-2-pyrrolidone, dipropylene glycol monomethyl ether, 2-methoxy-2-propanol, 2-methoxy-1-methylethyl acetate, polyglycols and fatty alcohols ethers, and heavy naphtha solvent. The surface where the graffitis are located is first wetted, and then the gel is applied to the graffitis using a brush or trowel, and rubbed into the graffiti. The gel is then removed using a sponge or wet cloth.

This gel contains some compounds such as heavy naphtha that are carcinogenic.

This gel is an essentially organic gel which only comprises organic and not mineral viscosifying agents.

This gel is not a gel that can be termed a suctionable mineral gel, and after treatment the removal thereof by wet process is tedious.

Document WO-A1-99/09134 [6] concerns a cleaning composition to remove long-chain compounds such as asphalt, tar, wax and chewing gum, which comprises an inert gel matrix enclosing a non-aqueous liquid solvent in which the long-chain compound is soluble.

The gel matrix is formed of a silica of a clay for example.

The solvent can be selected from among saturated and unsaturated hydrocarbons, alcohols, glycols, aldehydes, ketones, ethers, terpenes, phthalates, esters, or halogenated hydrocarbons.

Claim 7 cites at least 38 solvents among which ethyl acetate is incidentally mentioned.

The gel of this document is not a gel that can be termed a suctionable gel.

In addition, in this document, there is no description of the method used to apply or use the gel.

The only example given in this document concerns the removal of chewing gum the composition of which is far removed from that of graffitis which consist generally of paint. There is no mention or any suggestion in this document that the gel described therein could be used to solve the specific problem of graffitis removal.

Document GB-A-1487 737 [7] concerns a composition in the form of a gel to remove graffitis made of spray can paint, and comprises an organic solvent comprising a compound comprising an ester group and a compound comprising an ether group and an alcohol group, a gelling agent soluble in both water and in an organic solvent, and a surfactant leading to the formation of an oil-in-water emulsion when the composition is dispersed in water.

Among the very numerous compounds which may constitute the organic solvent, ethyl acetate is incidentally mentioned on page 2, lines 17 and 18.

The gelling, viscosifying agent of the composition is a water-soluble cellulose derivative such as hydroxypropyl cellulose.

Finely divided solid adsorbents such as silica or pyrogenated alumina can optionally be added to the composition to act as solid adsorbent for inorganic pigments and not as viscosifying agents.

Silica and alumina are therefore not used in the compositions of this document as inorganic viscosifying agents.

Solely the cellulose derivative such as hydroxypropyl cellulose acts as viscosifying agent and this is an organic viscosifying agent.

The gel of this document is therefore not a mineral gel, and it is not suctionable.

The gel can be applied with a brush or trowel, it is left in contact with the graffiti and then removed by rinsing with water using a hose or brush and large amounts of liquid effluent are thereby produced.

Also, for nuclear decontamination, gelled formulations which overcome problems related to the powdery nature of dry waste and which increase the efficacy of the method using a gel have been the subject of documents FR-A1-2 827 530 [8] and FR-A1-2 891 470 [9].

These documents describe inorganic colloidal gels called "suctionable gels", specifically formulated to be sprayed, and then to fracture on drying whilst trapping and confining radioactive contamination in the form of non-powdery suctionable flakes that can be directly packaged and stored.

Document [8] describes a gel consisting of a colloidal solution comprising an inorganic viscosifying agent generally silica or alumina, an active treatment agent which is e.g. an acid or inorganic base such as sodium hydroxide or potash, and optionally an oxidizing agent having a standard electrode potential $E^0$ higher than 1.4 V in a strong acid medium such as Ce(IV), Co(III) or Ag(II).

Document [9] describes a gel consisting of a colloidal solution comprising an inorganic viscosifying agent, generally silica or alumina, a surfactant, an acid or inorganic base, optionally an oxidizing agent having a standard electrode potential $E^0$ higher than 1.4 V in a strong acid medium such as Ce(IV), Co(III) or Ag(II).

These inorganic colloidal gels, on account of the different constituents of their composition, have a rheology allowing them to be sprayed onto a contaminated surface, followed by their adhesion to this surface even a vertical surface without run-off.

This allows extended contact between the contaminant and the active decontaminating agent, without the mechanical properties of the substrate being deteriorated.

After spraying, the gel dries, fractures and produces dry residues known as <<flakes>> adhering to the substrate which can subsequently be evacuated by brushing or suction for direct packaging.

The decontamination methods using these suctionable gels are therefore dry process decontamination methods, not generating any liquid effluent and few dry, solid residues. These dry, solid residues on average only represent one quarter of the initially sprayed gel mass. In addition, these methods limit the exposure time of operators to radioactive contamination, since they are easily applied by spraying followed by suction of the dry residues, and also because the presence of the operator is not required during the gel drying time.

However, the gels described in documents [8] and [9] are specifically intended for the radioactive decontamination of surfaces especially as part of the dismantling of nuclear plants, and are not in any way adapted for the removal of surface graffiti or even able to be adapted to solve the extremely specific problem of removing graffiti from surfaces.

Documents FR-A1-2962046 and WO-A1-2012/001046 [10] concern a "suctionable" biological decontamination gel and a method for the biological decontamination of surfaces using this gel.

This gel consists of a colloidal solution comprising at least one inorganic viscosifying agent, at least one biological decontamination agent, at least one super-absorbent polymer, at least one surfactant, and the remainder being solvent.

Documents FR-A1-3003763 and WO-A1-2014/154818 [11] concern a "suctionable" oxidizing alkaline gel for biological decontamination and a method for the biological decontamination of surfaces using this gel.

This gel consists of a colloidal solution comprising at least one inorganic viscosifying agent, an active biological decontamination agent consisting of the combination of a specific mineral base such as sodium hydroxide and of a specific oxidizing agent that is stable in a basic medium such as sodium hypochlorite, optionally a surfactant, the remainder being solvent. In addition, this gel does not contain any super-absorbent polymer.

However, the gels of documents [10] and [11] are specifically intended for the biological decontamination of surfaces, in particular the so-called post-event surface decontamination.

There is not any mention or any suggestion in documents [10] and [11] that the gels of these documents could be able to solve the extremely specific problem of removing graffitis from surfaces, which is a problem that fully differs from the problem of biological decontamination—particularly post-event decontamination—owing to the very particular nature of graffitis.

In the light of the foregoing, there is therefore a need for a composition and a method to remove graffitis from the surface of substrates which, whilst having high efficiency, and at least as high as the efficiency of the compositions and methods for removing graffitis set out above, do not have the disadvantages, defects, limitations and shortcomings of these compositions and methods and which solve the problems of the prior art compositions and methods for the removal of graffitis.

This composition and this method must in particular have high efficiency for the removal of graffitis, irrespective of the composition of these graffitis and irrespective of the material of the surface on which they have been applied.

This composition must be easy to apply and remove, and must produce a limited amount of wastes, especially of liquid wastes.

This composition must have very low, even no toxicity.

There is particularly a need for a composition and method to remove graffitis from the surface of substrates which limits the number of operators needed for implementation thereof, and limits tedious, laborious mechanical actions or actions which not require further training of operators.

The goal of the present invention inter alio is to meet these needs and requirements.

DESCRIPTION OF THE INVENTION

This goal, and still others, are achieved according to the invention with a gel to remove a graffiti from a surface of a solid substrate, consisting of a colloidal solution comprising, preferably consisting of:

0.1% to 30% by mass, preferably 0.1% to 25% by mass, more preferably 5% to 25% by mass, further preferably 8% to 20% by mass, for example 10% by mass relative to the total mass of the gel, of at least one inorganic viscosifying agent;

70% to 99.9% by mass, preferably 75% to 99.9% by mass, more preferably 75% to 95% by mass for example 90% by mass, of one or more solvent(s) selected from among alkyl acetates (straight-chain or branched alkyl group having 1 to 10 C) such as ethyl acetate, and the compounds of formula (I):

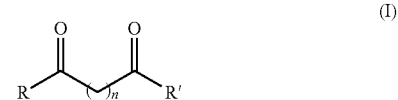

(I)

where R and R', the same or different, each independently represents a straight-chain or branched alkyl group having 1 to 10 C such as a methyl, ethyl, propyl or isopropyl group, or a straight-chain or branched alkoxy group having 1 to 10 C such as a methoxy, ethoxy, propoxy or isopropoxy group, and n is 1, 2 or 3;

optionally 0.1% to 2% by mass relative to the total mass of the gel, of at least one surfactant;

and optionally 0.01% to 10% by mass relative to the gel mass of at least one dye and/or pigment;

The term "gel" is perfectly clear for the man skilled in the art in this technical field and has already been used in numerous patents.

Similarly, the term inorganic "viscosifying agent" is perfectly clear for the man skilled in the art and has already been used in numerous patents.

Not all inorganic compounds are included in the definition of a "viscosifying agent". The man skilled in the art will have no difficulty in determining among the inorganic compounds those that are viscosifying agents. Viscosifying agents can generally be defined as agents which increase the viscosity of a liquid medium, such as a solution to which they are added, to form a gel (see below).

The gel of the invention has never been described in the prior art.

The gel of the invention is fundamentally characterized by the fact that it contains one or more specific solvent(s) selected from among ethyl acetate and the organic compounds of formula (I) described above.

This or these solvent(s) constitute the active ingredient of the gel of the invention and may be defined as active stripping agents.

This or these solvent(s) of the gel according to the invention is (are) scarcely (even not) toxic, harmful.

In other words, in the invention the greatest care has been taken so that the solvents of the gel are specifically selected among the least toxic and least harmful solvents, even non-harmful, with a view to protecting the operators applying the gel of the invention.

This is a characteristic which fundamentally differentiates the gel of the invention from the prior art anti-graffiti gels in which use is made of solvents, e.g. petrols that are toxic or harmful.

This or these solvent(s) of the gel of the invention are also solvents which have an odour that is scarcely or not at all foul-smelling or unpleasant.

In other words, the greatest care has been taken so that the solvents of the gel of the invention are selected from among solvents having an odour that is the least foul-smelling, the least unpleasant even not at all foul-smelling or unpleasant.

In other words, the solvents of the gel of the invention are selected from among those solvents which have limited "stench" and even zero and "stench".

The solvent or mixture of solvent(s) of the gel of the invention further generally has a volatility that is compatible with a good gel drying time i.e. a volatility which guarantees a drying rate that is not too fast and hence a drying time sufficient to ensure efficient removal, elimination of the graffitis, e.g. a drying time of 1 hour or more, in particular close to one hour.

Most of the above-mentioned solvents have a low volatility, are scarcely volatile and therefore, when used alone in the gel of the invention, allow sufficient drying time to be obtained e.g. a drying time of 1 hour or longer, in particular close to one hour.

However, some of the solvents mentioned above have a high volatility, give gels that dry too quickly and, when used alone in the gel of the invention, do not allow a sufficient drying time to be obtained which is the case for example of ethyl acetate.

These solvents having high volatility are therefore generally used in combination, in a mixture with another solvent having low volatility to obtain a sufficiently long drying time.

It is precisely the combination of said solvent having high volatility with another solvent having lower volatility which allows «slowing» of the gel drying and the obtaining of a good drying time, of a sufficient drying time.

Similarly, provision is generally made so that the volatility of the solvent or mixture of solvents is such that the gel does not dry too slowly and so that its drying time is not too long and does not exceed 4 hours for example.

The man skilled in the art is easily able, among the above-mentioned solvents of the gel of the invention, to identify those solvents having low volatility and those solvents having high volatility.

Surprisingly, and although the solvents of the gel of the invention are selected among solvents that are scarcely and even not toxic harmful, these solvents alone or in a mixture are nevertheless highly efficient in removing, eliminating, graffitis irrespective of their constituent substance e.g. paint or ink.

In particular, these solvents exhibit high efficiency for the removal elimination of graffitis, tags made of spray can paints.

Advantageously, the solvent(s) is (are) selected from among ethyl acetate, ethyl levulinate, acetylacetone, methyl levulinate, methyl acetoacetate, ethyl acetoacetate, dimethyl succinate, diethyl malonate, and the mixtures thereof.

Advantageously, the gel may comprise a mixture of ethyl acetate and diethyl malonate or methyl acetoacetate, preferably in mass proportions of 20% to 99%, more preferably 50% to 99% e.g. 80% of ethyl acetate, and 1% to 80%, preferably 1% to 50% e.g. 20% of diethyl malonate or methyl acetoacetate.

When the gel comprises such a mixture of solvents, this mixture generally represents 60% to 99% by mass e.g. 90% by weight of the gel mass, and the viscosifying agent is preferably alumina in a proportion of 0.1% to 30% by mass e.g. 10% by mass of the gel mass.

The mixture of ethyl acetate and diethyl malonate (see Example 1) surprisingly proved to give a gel having a reasonable drying time, namely 1 to 4 h for example, that is also very efficient.

The gel of the invention is a suctionable gel which has all the above-mentioned advantageous properties inherent in so-called suctionable gels, such as the gels of documents [8], [9], [10] and [11], with the fundamental difference however that with the gel of the invention contaminants are not displaced into flakes of dry gel, but an undesirable graffiti or tag—generally made of paint—is removed from a support, and the composition of the gel is therefore adapted accordingly.

As indicated above, the gels of these documents are aqueous gels specifically designed for radioactive or biological decontamination of surfaces, and having solvents and an active decontamination agent fully different from those of the gel of the invention.

There is no indication in documents [8], [9], [10] and [11] which would prompt the man skilled in the art to substantially modify the gels of these documents so that they can be used to remove graffitis.

The gel of the invention is a colloidal gel with an active substance which allows the removal of tags and graffitis, and which has a rheology adapted for application, preferably via spraying, onto tagged surfaces.

This is one of the advantages of the gel of the invention in that it is very easily applied by spraying.

The gel of the invention dries gradually, extending the contact time between the active stripping agent and the paint, and forms flakes which are easily detached from the surface by brushing/suctioning—hence the name suctionable gel—thereby carrying away undesirable ink or paint without deteriorating the material of the substrate, and even the original paint of this material.

The cleaning operator is therefore able to leave the gel to act on the graffiti paint whilst treating other surfaces, without having to be physically present during drying or having the tedious task of rubbing the paint with a solvent.

To summarise, the gels of the invention therefore meet all the above-mentioned needs, they do not have the disadvantages, defects, limitations and shortcomings of prior art anti-graffiti compositions such as those described in the documents mentioned above, and have all the known advantageous properties of so-called "suctionable:" gels.

The gel of the invention, although it contains a viscosifying agent that is generally exclusively inorganic, mineral, without any inorganic, mineral, viscosifying agent, may be termed an organic gel.

The content of organic matter of the gel of the invention is high, at least equal to 70% by mass e.g. 90% by mass since it contains at least 70 mass % e.g. 90 mass % of organic solvents.

The gel of the invention is a colloidal solution which means that the gel of the invention contains solid, inorganic, mineral particles of viscosifying agent, the elementary, primary particles thereof generally having a size of 2 to 200 nm. These solid, inorganic, mineral particles act as viscosifier to allow the solution to gel and thereby adhere to the surface to be treated irrespective of the geometry, shape, size thereof and wherever the graffiti to be removed are located.

The gel of the invention may generally and preferably be termed a "suctionable" gel, namely a gel which gives dry residues that can be suctioned, and which is sprayable, namely which can be sprayed, applied using a spraying method.

For a gel to be applicable with a spraying method it must have the properties of a rheofluidiflying (shear thinning) fluid (namely, with a viscosity which decreases with the shear rate), it must be thixotropic (namely having a time-dependent viscosity) with very short recovery time and it must have a threshold stress.

The gel must effectively have a very low viscosity under a very strong shear so that it behaves as a liquid when being sprayed.

It must then be thixotropic to recover strong viscosity after spraying, and finally it must have a sufficiently high threshold stress (typically higher than 15-20 Pa) with a short recovery time (generally less than one second) so that the gel does not flow under the effect of gravity on a vertical wall (for thicknesses preferably between 0.5 and 2 mm). For the gel subsequently to be considered suctionable, it must dry within a reasonable time of a few hours (see below) and then fracture into non-powdery flakes of millimeter size (see below) that can easily be suctioned.

Advantageously, the inorganic viscosifying agent may be selected from among metal oxides such as aluminas, metalloid oxides such as silicas, metal hydroxides, metalloid hydroxides, metal oxyhydroxides, metalloid oxyhydroxides, aluminosilicates, clays such as smectite, and the mixtures thereof.

In particular, the inorganic viscosifying agent may be selected from among aluminas ($Al_2O_3$) and silicas ($SiO_2$).

The inorganic viscosifying agent may only comprise one single silica or alumina or a mixture thereof, namely a mixture of two or more different silicas ($SiO_2/SiO_2$ mixture), a mixture of two or more different aluminas ($Al_2O_3/Al_2O_3$ mixture), or a mixture of one or more silicas with one or more aluminas ($SiO_2/Al_2O_3$ mixture).

Advantageously, the inorganic viscosifying agent may be selected from among pyrogenated silicas, precipitated silicas, hydrophilic silicas, hydrophobic silicas, acid silicas, basic silicas such as Tixosil® 73 marketed by RHODIA, and the mixtures thereof.

Among acid silicas, particular mention may be made of the pyrogenated silicas or silica fumes "Cab-O-Sil"® M5, H5 or EH5, marketed by CABOT, and of the pyrogenated silicas marketed by EVONIK INDUSTRIES under the name AEROSIL®.

Among these pyrogenated silicas, further preference is given to AEROSIL® 380 silica having a specific surface area of 380 $m^2/g$ which offers maximum viscosifying properties with minimum mineral load.

The silica used may also be a so-called precipitated silica obtained for example via a wet process, by mixing a solution of sodium silicate and an acid. The preferred precipitated silicas are marketed by EVONIK® INDUSTRIES under the name SIPERNAT® 22 LS and FK 310, or by RHODIA under the name TIXOSIL® 331, the latter being a precipitated silica having a mean specific surface area of between 170 and 200 $m^2/g$.

Advantageously, the inorganic viscosifying agent consists of a mixture of precipitated silica and a pyrogenated silica.

The alumina may be selected from among calcined aluminas, milled calcined aluminas and the mixtures thereof.

As an example, mention may be made of the product sold by EVONIK® INDUSTRIES under the trade name "Aeroxide Alumine C" which is a fine, pyrogenated alumina.

Advantageously, according to the invention, the inorganic viscosifying agent consists of one or more alumina(s) generally representing 5% to 30% by mass relative to the gel mass.

In this case, the alumina is preferably at a concentration of 7% to 15% by mass relative to the total mass of the gel, to ensure drying of the gel at a temperature between 20° C. and 50° C. and at a relative humidity of between 20% and 60% on average within 30 minutes to 5 hours.

The nature of the mineral viscosifying agent, in particular when it consists of one or more aluminas, has an unexpected influence on the drying of the gel of the invention and on the particle size of the residue obtained.

The dry gel is in the form of particles of controlled size, more specifically of solid millimeter-sized flakes having a size of generally 1 to 10 mm, preferably 2 to 5 mm, obtained in particular by means of the aforementioned compositions of the present invention, particularly when the viscosifying agent consists of one or more aluminas.

It is specified that the size of the particles generally corresponds to their largest dimension.

In other words, the solid mineral particles of the gel of the invention, e.g. of silica or alumina type, aside from their viscosifying function, also play a fundamental role during drying of the gel since they ensure fracturing of the gel to arrive at a dry waste in the form of flakes.

The gel may optionally contain a surfactant or a mixture of surfactants, preferably selected from among the family of non-ionic surfactants such as block, sequenced, copolymers e.g. block copolymers of ethylene oxide and propylene oxide, and ethoxylated fatty acids; and the mixtures thereof.

For this type of gel, the surfactants are preferably the block copolymers marketed by BASF under the trade name PLURONIC®.

Pluronics® are block copolymers of ethylene oxide and propylene oxide.

These surfactants have an influence on the rheological properties of the gel, in particular on the thixotropic nature of the product and on its recovery time, and prevent the onset of run-off.

In addition, the surfactants provide control over adhesion of the dry waste and control the size of the flakes of the dry residue to guarantee the non-pulverulence of the waste.

Advantageously, the gel of the invention may further comprise at least one mineral pigment.

When present, the mineral pigment represents 0.01% to 10%, preferably 0.1% to 5% by mass relative to the total mass of the gel.

The invention further concerns a method to remove a graffiti on a surface of a solid substrate, wherein at least one cycle is performed comprising the following successive steps:

a) the gel of the invention such as described above is applied on said surface;

b) the gel is maintained on the surface at least for a sufficient time so that the gel removes (eliminates) the graffiti, and so that the gel dries and forms a dry and solid, non-powdery residue containing compounds resulting from the removal of the graffiti;

c) the dry and solid residue, containing the compounds resulting from removal of the graffiti, is removed.

The solid substrate may be a porous substrate, preferably a mineral porous substrate.

The efficiency of the gel and of the method of the invention is just as effective in the presence of a non-porous and/or non-mineral surface as in the presence of a porous and/or mineral surface.

Advantageously, the substrate is mad of at least one material selected from among metals and alloys such as stainless steel, galvanized steel or zinc; painted steels; organic polymers such as plastic materials or rubbers e.g. polyvinyl chlorides or PVC, polypropylenes or PP, polyethylenes or PE, in particular high density polyethylenes or HDPE, poly(methyl methacrylate)s or PMMA, poly(vinylidene fluoride)s or PVDF, polycarbonates or PC; glasses; cementitious materials such as pastes, cements, mortars and concretes; plasters; bricks; tiles; raw earth or baked earth; natural or artificial stones; coats; glass fibre; fibrocements; asphalt; tar; slate; cellulose-based materials such as wood; and ceramics.

Generally, the graffiti comprises a paint in particular a spray can paint, an ink or a mixture thereof.

Advantageously, the gel is applied on the surface where the graffiti is located in an amount of 100 g to 2000 g of gel per m$^2$ of surface, preferably 500 to 1500 g of gel per m$^2$ of surface, more preferably 600 to 1000 g of gel per m$^2$ of surface, which generally corresponds to a gel thickness deposited on the surface of between 0.1 mm or 0.5 mm and 2 mm.

Advantageously, the gel is applied on the solid surface by spraying, with a brush or a trowel.

Advantageously, (during step b)), drying takes place at a temperature of 1° C. to 50° C., preferably 15° C. to 25° C., and under a relative humidity of 20% to 80%, preferably 20% to 70%.

Advantageously, the gel is maintained on the surface for a time of 30 minutes to 72 hours, preferably 1 to 48 hours, more preferably 1 to 24 hours, further preferably 1 to 5 hours e.g. 1 to 4 hours.

Advantageously the dry and solid residue is in the form of particles, e.g. flakes having a size of 1 to 10 mm, preferably 2 to 5 mm.

Advantageously, the dry and solid residue is removed from the solid surface by brushing and/or suction.

Advantageously, the above-described cycle may be repeated 1 to 10 times using the same gel during all cycles or using different gels during one or more cycles.

Advantageously, during step b), the gel, before its complete drying, is rewetted with a solvent, preferably with the solvent of the gel applied during step a), which generally avoids having then to repeat the application of the gel onto the surface, provides savings in reagent and limits the amount of waste. This rewetting operation may be repeated 1 to 10 times for example.

The method of the invention has all the advantageous properties inherent in the decontamination gel used and which have already been largely set forth above.

The method of the invention allows the efficient, curative management of undesirable tags, graffitis whilst being much less tedious and much less costly than conventional methods for the cleaning of the tags, namely:
  methods using high pressure means that are costly and "technical" (complex),
  methods using cloths impregnated with harmful solvents that are lengthy and tedious to implement;
  methods using protective films that are labour and time consuming.

Therefore, the gel of the invention may be sprayed using a simple paint gun that is commercially available, whilst sandblasting equipment for example requires adjustments and special training. This sandblasting equipment is complex with high-cost maintenance.

In addition, the method of the invention is a dry method which avoids spills of solvent or stripping agent whilst optimising the work time of the cleaning operator. Operators are able to treat several areas rapidly at a time on account of the gel drying time and of its advantageous implementation via spraying.

To summarise, the method and gel of the invention inter alio, apart from the advantageous properties specifically due to the specific solvent contained in the gel, have the following other advantageous properties:
  application of the gel preferably by spraying, which is not possible with most prior art anti-graffiti gels described above. Spraying allows large surface areas to be rapidly and easily treated and requires fewer operators;
  adherence to the walls;
  maximum efficiency of graffiti removal obtained after the drying phase of the gel, also in the event of penetrating graffiti in particular in the case of porous surfaces.

In general, provision is made so that the drying time is equal to or longer than the time needed to remove the graffiti. For deep-lying graffiti recourse is generally had to rewetting.
  treatment of a very broad range of materials (see Example 2);
  no mechanical or physical deterioration of the materials at the end of the treatment;
  implementation of the method under variable weather conditions (see Examples);
  reduction in the waste volume;
  easy recovery of the dry waste.

The Examples given below show that the gel of the invention, on account of its specific formulation and of its simple, reliable and easy implementation, is efficient in removing a large variety of undesirable graffitis on a large variety of materials.

Other characteristics and advantages of the invention will become better apparent on reading the following detailed description, this description being illustrative and nonlimiting, with reference to the appended drawings.

The surface of this plate, from left to right, comprises a first blank portion where neither tag nor gel were deposited, a second portion where a tag was applied but not treated with the gel, a third portion where the gel was applied on the tag and the dry gel flakes brushed off.

Figure 1:
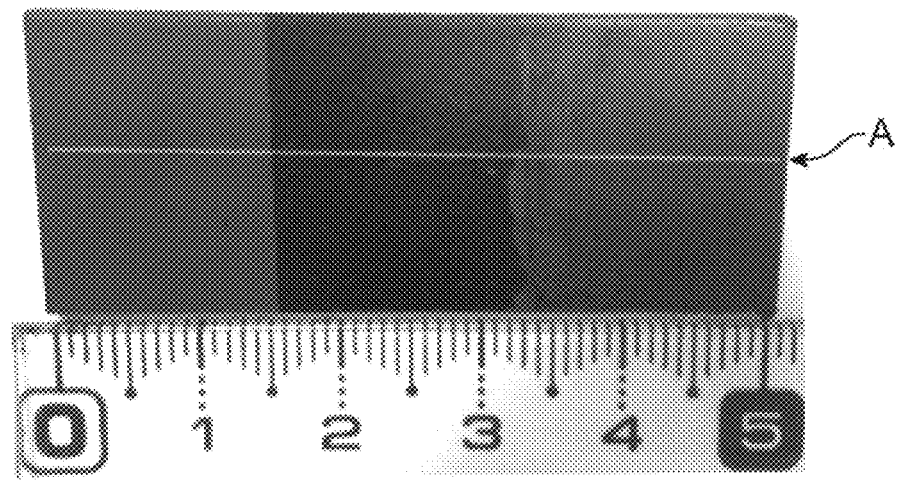
FIG. 1 is a photograph of the surface of the tested tagged painted steel plate, at the end of the test of Example 1 to evaluate the efficiency of a gel of the invention in which the active ingredient is a mixture of ethyl acetate and diethyl malonate for the removal, elimination, of a graffiti, a tag, applied on this painted steel plate.
Figure 2:
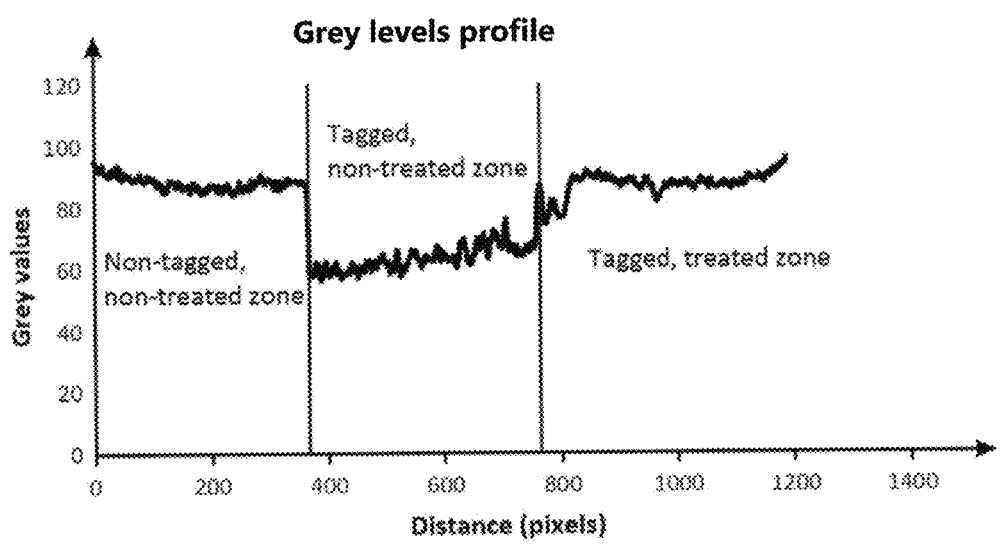

FIG. 2 is a graph showing the profile in grey levels (shades of grey, grey shades) along line A represented on the photograph of FIG. 1, obtained after image analysis of this photograph performed using ImageJ software.

The distance (in pixels) is plotted along the X-axis, and the grey values (grey shades) are plotted along the Y-axis.

Figure 3:
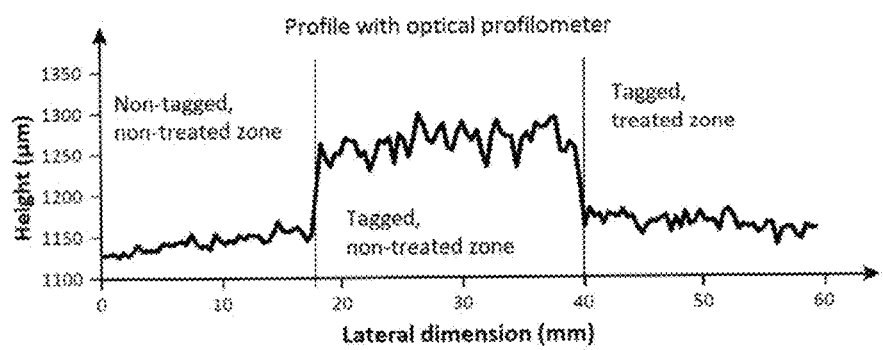

FIG. 3 is a graph showing the roughness profile—measured with a STIL optical profilometer—of the tagged, painted steel plate at the end of the test of Example 1.

The travel (in mm) is plotted along the X-axis and the height (in μm) is plotted along the Y-axis.

Figure 4:
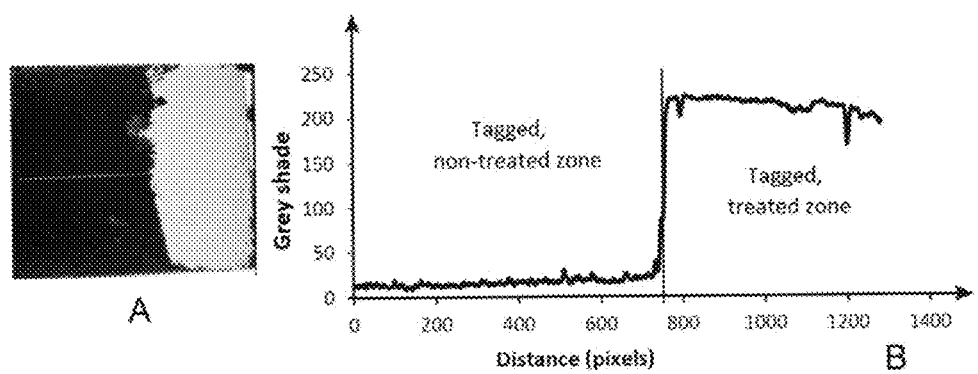
Figure 5:
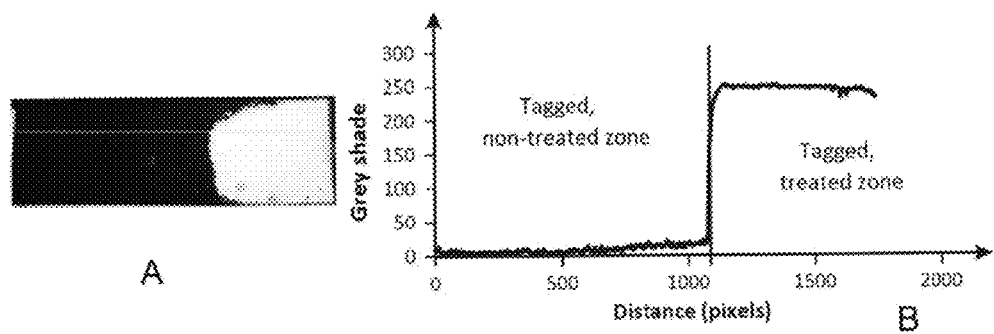
Figure 6:
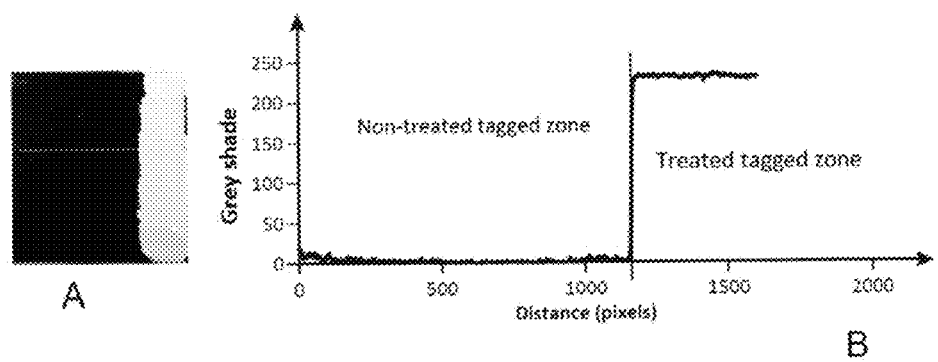
Figure 7:
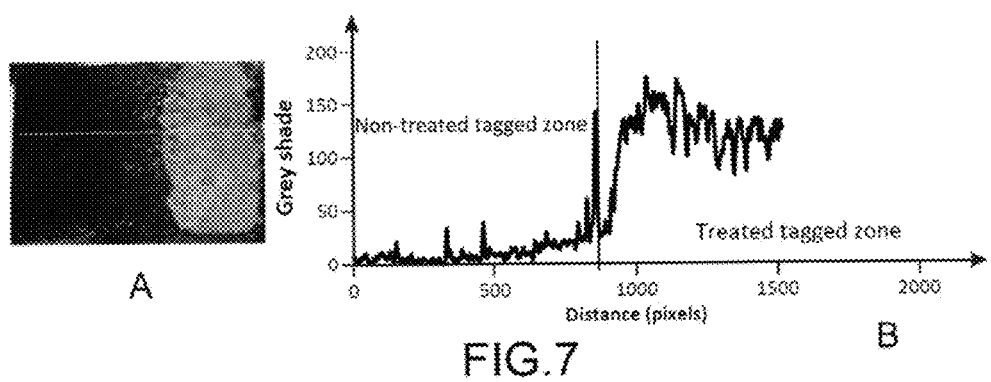

FIGS. 4(A,B) to 8(A,B) are graphs showing profiles in grey levels (shades of grey, grey shades) (FIGS. 4B to 8B), along a line plotted in the same manner as on the photograph of FIG. 1, obtained from an image analysis using ImageJ software of photographs (FIGS. 4A to 8A) of the surface of the tested, tagged made of various materials, at the end of the tests of Example 2.

Figure 8:
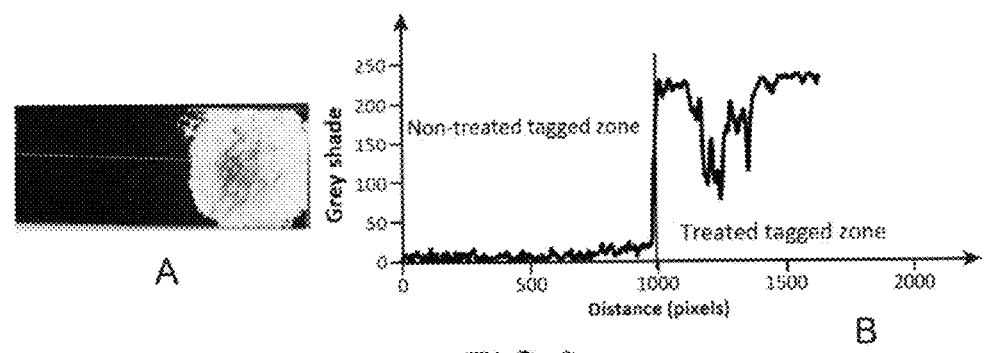

These materials are stainless steel (FIG. 4), painted steel (see Example 1), glass (FIG. 5), ceramic (FIG. 6), concrete (FIG. 7) and a plastic material: PVC (FIG. 8).

Throughout these tests the efficiency was evaluated of a gel of the invention, which is the gel of Example 1, to remove graffitis tagged on various materials.

On FIGS. 4B to 8B: the distance is plotted along the X-axis (in pixels) and the grey values (grey shades) along the Y-axis.

Figure 9:
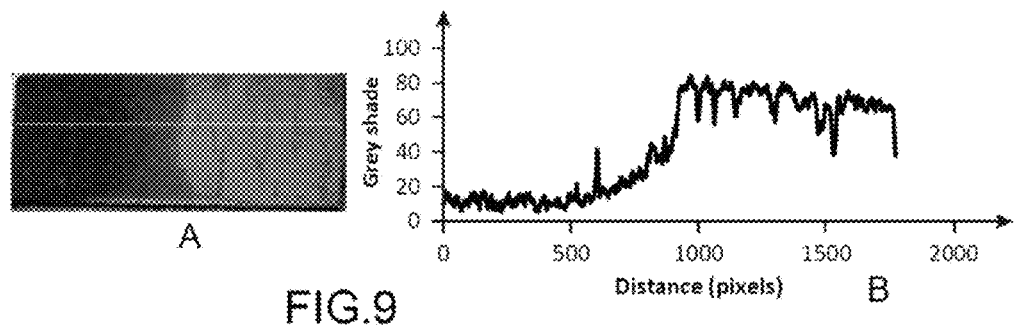
Figure 10:
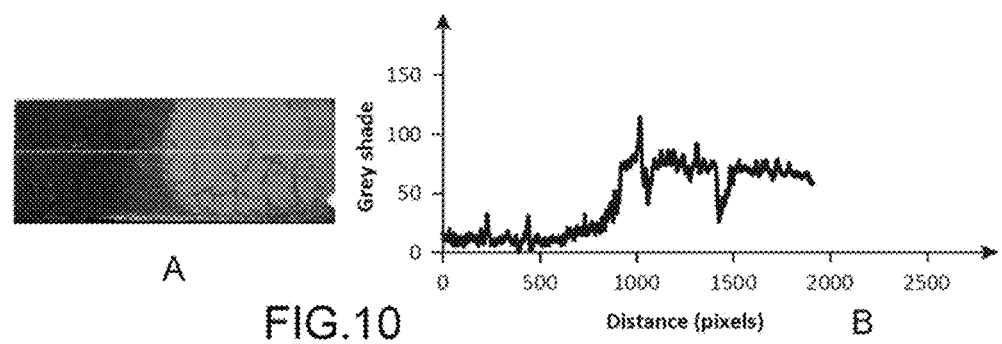
Figure 11:
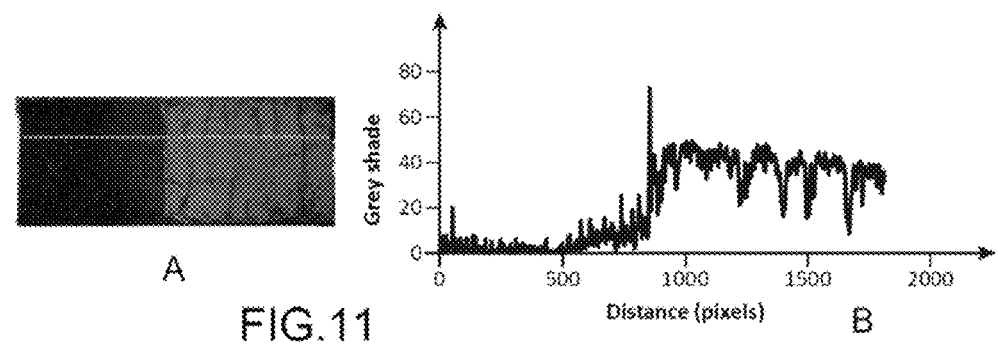
Figure 12:
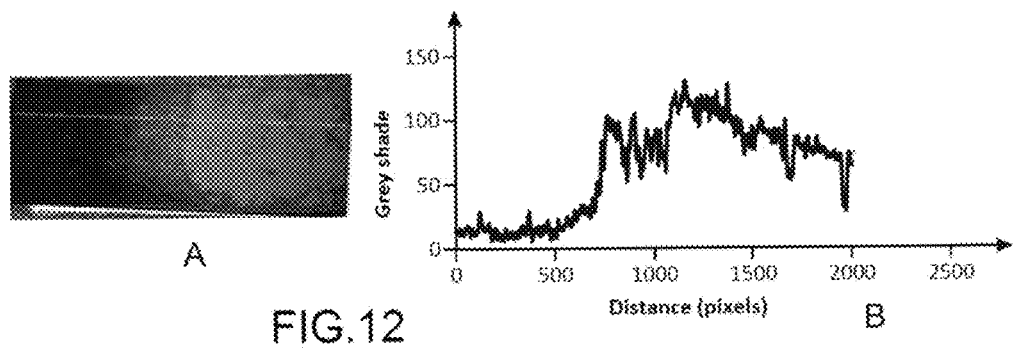
Figure 13:
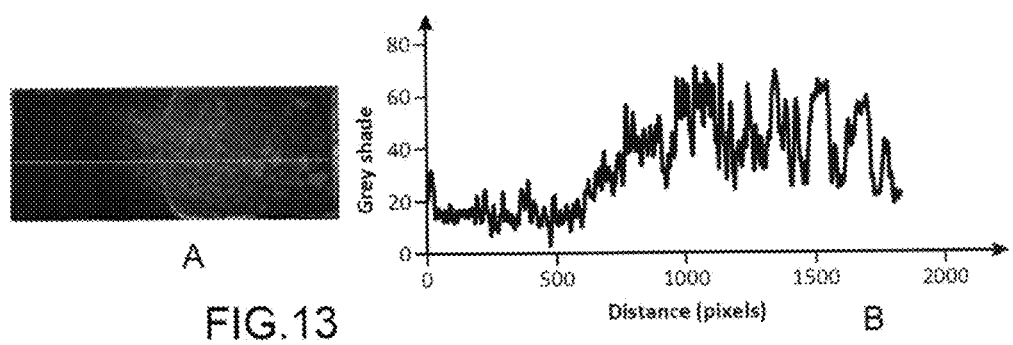
Figure 14:
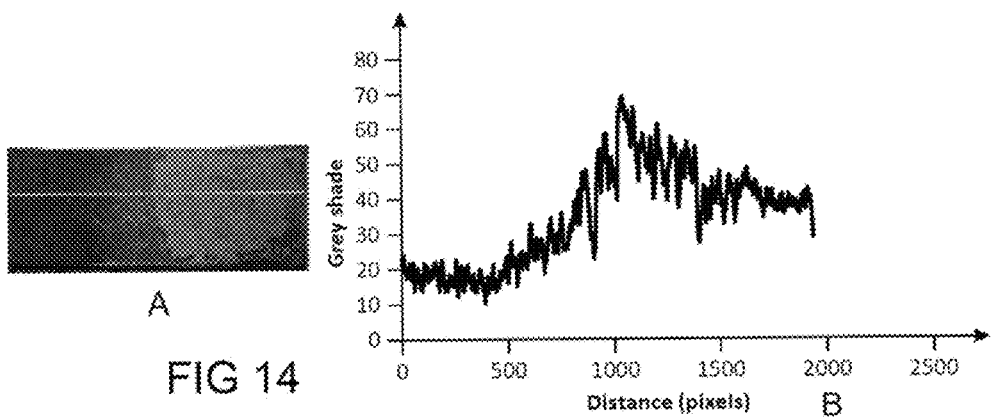
Figure 15:
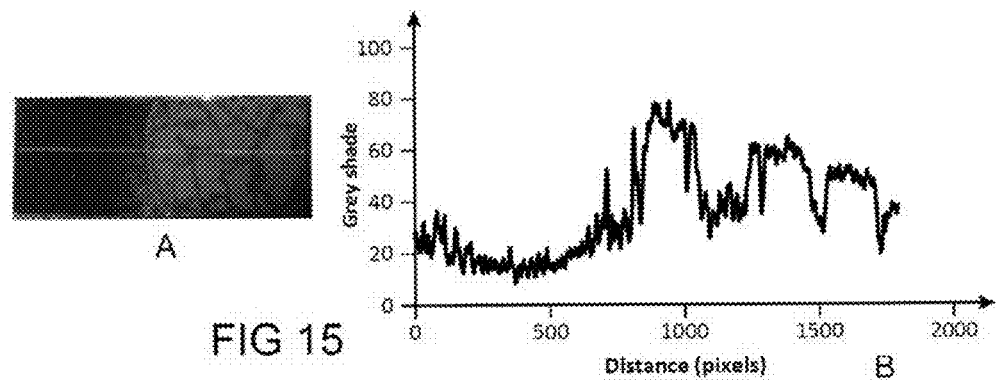
Figure 16:
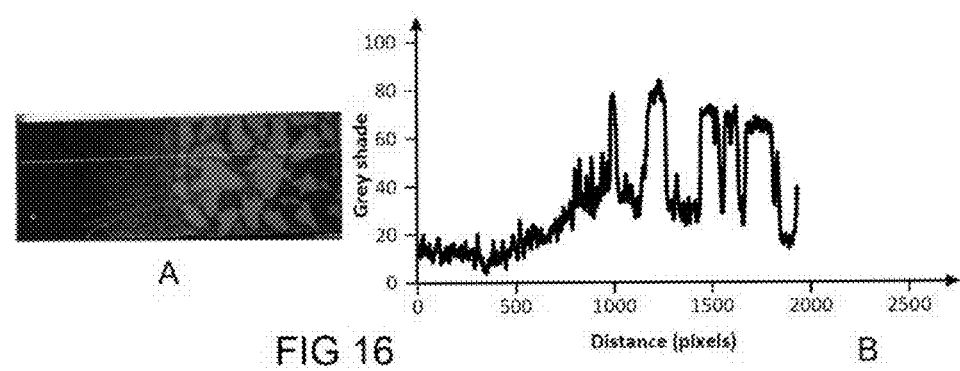

FIGS. 9(A,B) to 16(A,B) are graphs showing the profile in grey levels (grey shades) (FIGS. 9B to 16B), along a line plotted in the same manner as in the photograph of FIG. 1, obtained from an image analysis using ImageJ software of a photograph (FIGS. 9A to 16A) of the surface of the tested, tagged, painted steel plate at the end of each of the tests of Example 4.

Throughout these tests, the efficiency was evaluated of a gel according to the invention, the active ingredient of which was respectively ethyl acetate (FIG. 9), ethyl levulinate (FIG. 10), acetylacetone (FIG. 11), methyl levulinate (FIG. 12), methyl acetoacetate (FIG. 13), ethyl acetoacetate (FIG. 14), dimethyl succinate (FIG. 15), diethyl malonate (FIG. 16), for the removal of a graffiti tag deposited on this plate of painted steel.

On FIGS. 9B to 16B: the distance (in pixels) is plotted along the X-axis and the grey values (grey shades) are plotted along the Y-axis.

Figure 17:
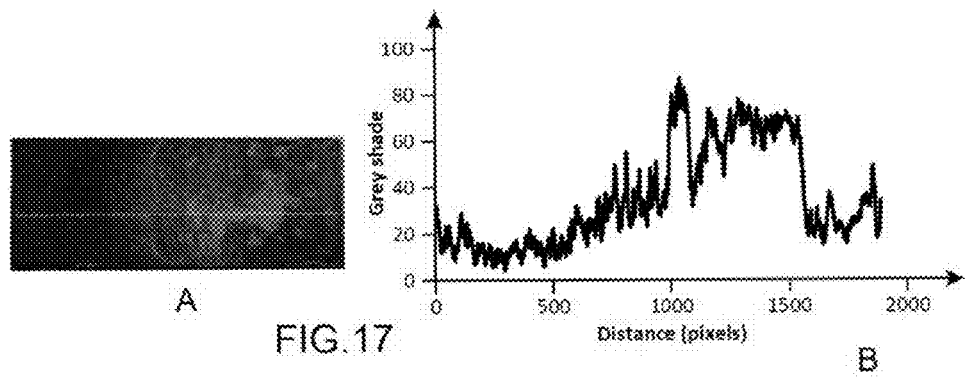

FIGS. 17(A,B) is a graph showing the profile in grey level (grey shade) (FIG. 17B), along a line plotted in the same manner as on the photograph of FIG. 1, obtained from an image analysis using ImageJ software of a photograph (FIG. 17A) of the surface of the tested, tagged, painted steel plate, at the end of the test of Example 5.

Throughout this test, the efficiency was evaluated of a gel according to the invention having as active ingredient a mixture of ethyl acetate and methyl acetoacetate, for the removal of a graffiti, tag deposited on this plate of painted steel.

On FIG. 17B: the distance (in pixels) is plotted along the X-axis and the grey values (grey shades) are plotted along the Y-axis.

Figure 18:
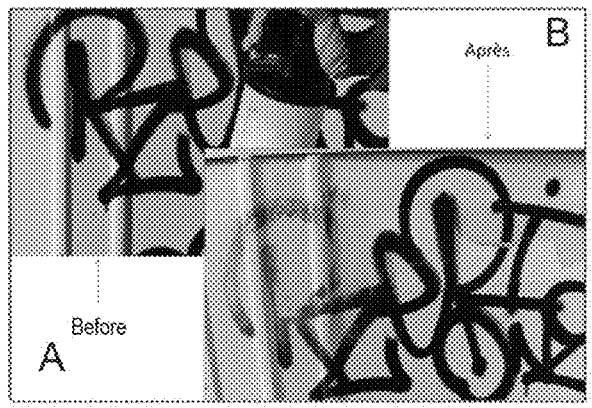

FIG. 18 shows photographs of an electric transformer made of painted steel soiled by graffitis before (FIG. 18A) and after (FIG. 18B) treatment of these graffitis by application of a gel according to the invention composed of 89 mass % acetylacetone and 11 mass % alumina (Example 6).

Figure 19:

FIG. 19 shows photographs of a bridge pier made of concrete soiled by graffitis before (FIG. 19A) and after (FIG. 19B) treatment of these graffitis by application of a gel according to the invention composed of 89 mass % acetylacetone and 11 mass % alumina (Example 6).

Figure 20:
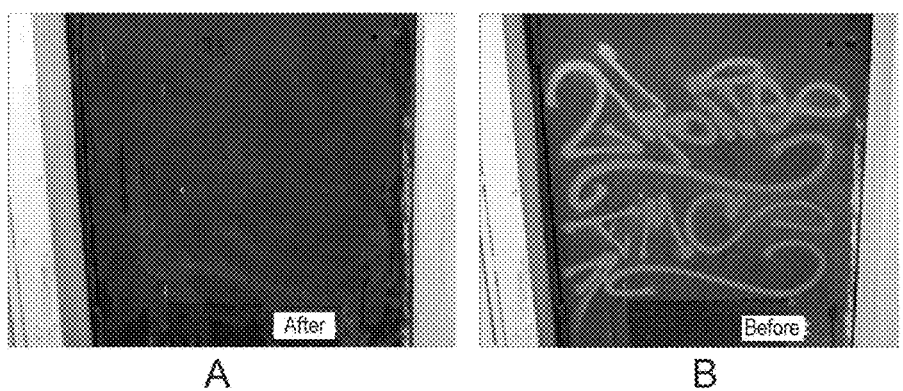

FIG. 20 shows photographs of a painted metal door soiled by graffitis before (FIG. 20B) and after (FIG. 20A) treatment of the graffitis by application of the reference gel according to the invention described in Example 1.

DETAILED DESCRIPTION OF PARTICULAR EMBODIMENTS

The gel of the invention can easily be prepared at ambient temperature.

For example, the gel of the invention may be prepared preferably by gradually adding the inorganic viscosifying agent(s) e.g. the alumina(s) and/or silica(s) to the solvent(s), or to the mixture of the solvent(s) and of the optional adjuvant(s). The optional adjuvants are generally the surfactant(s), the mineral pigment(s).

This mixture of the solvent(s) and of the optional adjuvants(s) may be obtained by mechanical agitation e.g. using a mechanical agitator equipped with a three-blade impeller. The rotation speed is 200 rpm for example, and the agitation time is 3 to 5 minutes for example.

The addition of the inorganic viscosifying agent(s) to the solvent(s), or to the mixture of the solvent(s) and of the optional additive(s) may be obtained by simply pouring the viscosifying agent(s) into the said solvent(s) or said mixture.

When adding the inorganic viscosifying agent(s) to the solvent(s), or to the mixture of the solvent(s) and of the optional adjuvant(s), this or these solvent(s) or this mixture are generally kept under mechanical agitation.

This agitation may be carried out for example using a mechanical agitator equipped with a three-blade impeller.

The agitation speed is gradually increased as and when the viscosity of the solution increases, to reach a final agitation speed of between 400 and 600 rpm for example, without any splashing.

After the end of the addition of the mineral viscosifier(s), agitation is continued e.g. for 2 to 5 minutes to obtain a fully homogeneous gel.

Evidently, other protocols could be used to prepare the gels used in the invention, with the addition of the gel components in a different order from the order mentioned above.

In general, the viscosity of the gel used in the invention must be lower than 200 mPa·s under a shear of $1000$ $s^{-1}$ to allow spraying onto the surface to be decontaminated, at a distance (e.g. at a distance of 1 to 5 m) or close thereto (e.g. a distance of less than 1 m, preferably 50 to 80 cm). The viscosity recovery time must generally be less than one second and the viscosity under low shear must be higher than 10 Pa·s to prevent run-off on a wall.

It is to be noted that the optional surfactant in the gel of the invention favorably and significantly impacts the rheological properties of the gel used in the invention. This surfactant particularly allows the gel of the invention to be applied by spraying and prevents risks of spillage or run-off when treating vertical surfaces and ceilings. This surfactant also allows limiting of the bleeding phenomenon observed when storing the gel.

The gel thus prepared is then applied to the solid surface to be cleaned of a substrate made of a solid material.

By surface to be cleaned is meant a solid surface on which a graffiti, tag, is located that it is desired to remove.

There is practically no limitation with regard to the constituent material of the surface to be cleaned; the gel of the invention can be used, without causing any damage, to treat all kinds of materials even fragile materials.

The gel of the invention does not generate any deterioration, erosion, chemical, mechanical or physical attack of the treated material. The gel of the invention does not therefore in any way impair the integrity of the treated materials, and even allows the reuse thereof. For example, monuments, buildings, pieces of art such as sculptures treated with the gel of the invention are absolutely not degraded and have their visual and structural integrity maintained.

This substrate material can therefore be selected from among the materials already listed above e.g. from among metals or alloys such as stainless steel, polymers such as plastic materials or rubbers among which mention can be made of PVC, PP, PE in particular HDPE, PMMA, PVDF, PC, glasses, cements, mortars and concretes, plasters, bricks, natural or artificial stones, coats, ceramics.

The treated surface may or may not be painted.

In all cases (see Example 2, and FIGS. 4 to 8 and 1 to 3), irrespective of the material e.g. stainless steel, painted, lacquered, steel, glass, ceramic, concrete, PVC, the efficiently of the cleaning according to the invention is total.

There is also no limitation as to the shape, geometry and size of the surface to be cleaned, the gel of the invention allows the treatment of large-size surfaces, complex geometries having hollows, corners and recesses for example.

The gel of the invention ensures the efficient treatment not only of horizontal surfaces but also of vertical surfaces such as walls, facades, bridge piers, doors, or sloped or overhanging surfaces such as ceilings.

The gel of the invention also guarantees complete, efficient removal of graffitis irrespective of the paint, ink or other, which constitutes said graffitis, irrespective of the colour of these graffitis and irrespective of the pigment or dye they contain (see Example 3). The gel of the invention particularly allows the efficient removal of graffitis, tags, made of spray can paint.

The efficiency of the gel of the invention has been demonstrated on real graffitis on various substrates (see Example 6, FIGS. 18 to 20).

Compared with existing techniques using liquids such as solutions, the invention uses a gel which is particularly advantageous for the treatment of surfaces of materials having large surface areas, non-transportable and located outdoors. Since a gel is used, the method of the invention allows in situ cleaning, avoiding the spillage of chemical solutions into the environment and the dispersion of the contaminating species.

The gel of the invention may be applied to the surface to be treated using any application method known to the man skilled in the art.

Conventional methods are spraying using a gun for example, or application using a brush or trowel.

For application of the gel by spraying onto the surface to be treated, the colloidal solution can be conveyed by a low pressure pump for example, e.g. a pump applying a pressure of 7 bar or less i.e. about $7.10^5$ Pascals.

Burst of the gel on the surface can be obtained for example using a flat or round jet nozzle.

The distance between the pump and the nozzle may be any distance e.g. it may be 1 to 50 m, in particular 1 to 25 m.

The sufficiently short viscosity recovery time of the gels used in the invention allows the sprayed gels to adhere to any surface e.g. to walls.

The amount of gel deposited on the surface to be treated is generally 100 to 2000 $g/m^2$, preferably 500 to 1500 $g/m^2$, more preferably 600 to 1000 $g/m^2$.

The amount of gel deposited per unit surface area, and hence the thickness of the deposited gel, impacts the drying rate.

Therefore, when a gel, film, layer of a thickness of 0.5 mm to 2 mm is sprayed onto the surface to be treated, the drying time, which is then generally the efficient contact time, is sufficient for proper treatment of the surface leading to removal of the graffiti. The efficient contact time is the period during which the active substance contained in the gel, which is none other than the solvent(s), interacts with the graffiti.

The drying time is not only dependent on the thickness of the applied gel layer but also on weather conditions, namely relative humidity and temperature.

The man skilled in the art is easily able, as a function of weather conditions and within the thickness range of 0.5 mm to 2 mm mentioned above, to determine the thickness of the gel layer to be applied to the graffitis to obtain gel efficiency and removal of the graffitis.

For example, if the relative humidity RH is 20% at 40° C., it is possible that the drying of a gel layer of a thickness of 0.5 mm applied on a graffiti may to be too rapid to allow efficient removal of this graffiti. On the contrary, if the temperature is 15° C. with 50% RH, the drying of a layer of the same gel of the same thickness will allow efficient removal of this graffiti.

In addition, it has surprisingly been shown that the amount of deposited gel, when within the above-mentioned ranges and in particular when it is greater than 500 $g/m^2$ and especially in the range of 500 to 1500 $g/m^2$—which corresponds for example to a minimum thickness of deposited gel greater than 500 μm for an amount of deposited gel greater than 500 $g/m^2$—allowed the obtaining of fracturing of the gel after drying into millimeter-size flakes e.g. of a size of 1 to 10 mm, preferably of 2 to 5 mm that can be suctioned.

The amount of deposited gel and hence the thickness of deposited gel, preferably greater than 500 $g/m^2$ i.e. 500 μm, is the fundamental parameter which impacts the size of the dry residues formed after drying of the gel, thereby ensuring that dry residues of millimeter size and not powdery residues are formed, such residues easily being removed via a mechanical method and preferably via suction.

However, it is also to be noted that when the gel contains a surfactant in low concentration, drying of the gel is improved and leads to a phenomenon of homogenous fracturing with dry residues of monodisperse size and an increased ability of the dry residues to detach from the support.

The gel is maintained on the surface to be treated for the duration of time needed for drying. Throughout this drying step, that can be considered to be the active phase of the method of the invention, the solvent(s) contained in the gel evaporate(s) until a dry, solid residue is obtained.

The drying time is dependent on the composition of the gel in the ranges of concentration of the constituents thereof given above, but also as already specified on the amount of gel deposited per unit surface area i.e. the thickness of the deposited gel.

The drying time is also dependent on the weather conditions, namely temperature, ventilation and relative humidity of the atmosphere surrounding the solid surface.

The method of the invention may be implemented under extremely varying weather conditions, namely at a temperature T of 1° C. to 50° C. and under a relative humidity of 20% to 80%.

The drying time of the gel of the invention is therefore generally 15 minutes to 24 hours, preferably 1 hour to 24 hours at a temperature T of 1° C. to 50° C. and at a relative humidity RH of 20% to 80%.

It is to be noted that the formulation of the gel used in the invention, in particular when it contains surfactants such as "Pluronics®", in general (i.e. particularly under reasonable weather conditions as indicated above) ensures a drying time that is substantially equivalent to the contact time between the gel and the graffiti that is necessary, required to destroy, remove the graffiti polluting this material.

In other words, the formulation of the gel ensures a drying time that is none other than the time needed to remove, destroy the graffiti, and it is compatible with the destruction kinetics of the graffiti and particularly with the destruction kinetics of the paint, ink or other, constituting the graffiti.

At the end of the drying of the gel, it fractures homogeneously to give dry, solid residues of millimeter size, e.g. of a size of 1 to 10 mm, preferably 2 to 5 mm that are non-powdery, generally in the form of solid flakes. The dry, solid residues contain compounds resulting from destruction of the graffiti.

The dry residues, such as flakes, obtained at the end of the drying have low adherence to the surface of the cleaned material. On this account, the dry residues obtained after drying of the gel can easily be recovered by mere brushing and/or suction. However, the dry residues can also be evacuated via a jet of gas e.g. a jet of compressed air.

No rinsing is generally required and the method of the invention does not generate any secondary effluent.

However, light rinsing e.g. with water of the treated surfaces, without any mechanical action such as brushing, may exceptionally be necessary to remove any residual traces of paint and small gel residues.

According to the invention therefore, firstly, major savings in chemical reagents are obtained compared with a cleaning method by washing with a solution. Next, since a waste is obtained is in the form of a dry residue that is directly suctionable, a rinsing operation with water or with a liquid is generally avoided. The result is evidently a reduction in the amount of effluent produced, but also notable simplification in terms of subsequent treatment facility and outlets (discharge channels). In particular, according to the invention, the waste obtained on completion of treatment is not carried into rainwater evacuation networks in breach of regulations.

On account of the composition of the gel used in the invention, the waste produced, once dry, only represents a small volume and is essentially mineral. It can therefore be stored or directed towards an evacuation facility without prior treatment.

For example, in the common case in which 1000 grams of gel are applied per m² of treated surface area, the weight of dry waste produced is less than 300 grams per m².

The invention will now be described with reference to the following examples that are non-limiting and given for illustration purposes.

EXAMPLES

The gels used in the following examples are gels composed of alumina and of one or more organic solvents.

This or these organic solvents form the active stripping substance of these gels.

The alumina is Aeroxide® Alu C marketed by EVONIK® INDUSTRIES having a specific surface area of 100 m²/g (BET).

The organic solvent(s) are selected from the ketone family and ester family, and meet formula (I) given above.

The solvents of the gel formulations in the following examples are listed in Table 1 below.

TABLE I

Solvents used in the Examples.

| Solvent | CAS N° | Chemical formula |
|---|---|---|
| Ethyl acetate | 141-78-6 | 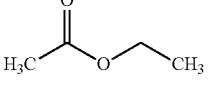 |

TABLE I-continued

Solvents used in the Examples.

| Solvent | CAS N° | Chemical formula |
|---|---|---|
| Ethyl levulinate | 539-88-8 | 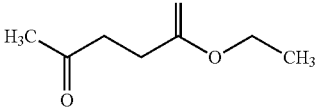 |
| Acetylacetone | 123-54-6 | 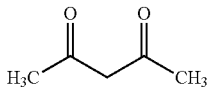 |
| Methyl levulinate | 624-45-3 | 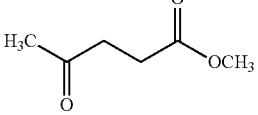 |
| Methyl acetoacetate | 105-45-3 | 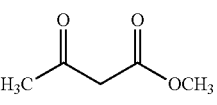 |
| Ethyl acetoacetate | 141-97-9 | 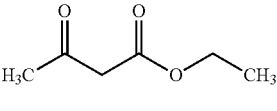 |
| Dimethyl succinate | 106-65-0 | 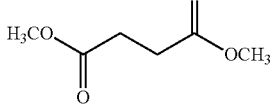 |
| Diethyl malonate | 105-53-3 | 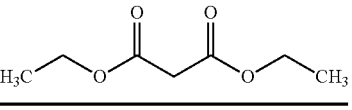 |

The gels of the invention used in the following examples were prepared as follows: the solvent(s) were mixed using a mechanical agitator equipped with a three-blade impeller at a speed of 200 rpm for 3 to 5 minutes. The alumina, in a proportion of 7 to 11 mass % depending on gels, was gradually added in the reaction mixture, progressively increasing the agitation speed as and when viscosity increased to arrive at about 400 to 600 rpm without any splashing. The gel was then kept under agitation for 5 minutes.

The gels thus prepared were then tested on different types of graffitis, tags, on different materials, and were applied thereto with a spatula or a sprayer.

The thickness of the applied gel was 0.5 to 2 mm depending on the application means used.

In all cases the tested gel dried, fractured absorbing the graffiti paint and formed flakes that could be brushed off.

The drying time of the gels varied as a function of the solvent or mixture of solvents used. This drying time may range from 15 minutes for ethyl acetate to 48 h for ethyl levulinate.

Light wet brushing was needed in some cases to remove the graffiti paint residues which were not trapped in the dry gel flakes.

Example 1

In this example, the efficiency was evaluated of a gel of the invention having an active agent that was a mixture of ethyl acetate and diethyl malonate to remove a graffiti, a tag, deposited on a substrate made of an ordinary material, namely lacquered painted steel.

The gel used in this example was a mixture of alumina (10 mass %) and of an active agent (90 mass %) that was a solvent mixture ((80:20 by mass of ethyl acetate:diethyl malonate).

This gel was prepared following the above-described protocol.

This gel formed the reference gel and is used below in numerous other examples.

The efficiency of the gel in removing graffitis is shown on the photographs but also by determining a profile of the support using an optical profilometer.

The test intended to demonstrate the efficiency of the gel was carried out with the following protocol:

A cut-out piece, plate of lacquered painted steel was coated on two thirds of its surface, located on the right-hand side, with a graffiti, tag made of a black paint from a tag spray can manufactured by a leading manufacturer of graffiti paint, namely MOLOTOW® CoversAll2™ Outline Black high covering paint. Once well coated with paint, the plate was left under a fume hood to dry for 24 h. The gel was then applied with a spatula over the right-most third of the surface of the plate with a thickness of 0.5-2 mm. After complete drying of the gel, the dry gel flakes were brushed off and the plate roughly rinsed so that image analysis (grey levels, grey shades) using software (ImageJ) and measurement with a profilometer could be carried out. The profilometer was manufactured by STIL (Sciences et Techniques Industrielles de la Lumière) and was used to plot roughness profiles and to measure the mean roughness on the different parts, pieces.

The surface of the tagged, painted steel plate was divided into three portions, namely from the left to the right:
- a first blank portion where neither gel nor tag were deposited;
- a second portion where the tag was applied but not treated with the gel;
- a third portion where the gel was applied to the tag and the flakes of dry gel brushed off.

The results are given FIGS. 1, 2 and 3.

It can be seen in the final photograph (FIG. 1) and on the grey level (grey shade) profile obtained from this photograph, along the light-coloured line A drawn in FIG. 1, that the black paint of the tag has been successfully removed on the right-hand portion of the plate treated with the gel.

The grey level (grey shade) on the portion "detagged" with the gel on the right, is the same as on the portion that remained blank on the left (FIG. 2).

To confirm this result, a roughness profile plotted from the left to the right on the plate (FIG. 3) clearly shows an increase in the thickness and an increase in roughness when passing from the blank portion to the painted portion, followed by loss of thickness and roughness when passing on the "detagged" portion, proving removal of the thickness of the tag paint.

Example 2

In this example, the reference gel of Example 1 according to the invention was evaluated for its efficacy in removing graffiti on different types of materials, namely stainless steel, painted steel (see Example 1, FIGS. 1 to 3), glass, ceramic, concrete and a plastic material: PVC.

As in Example 1, plates made of each of these materials were provided with a graffiti, tag made of a black paint from a tag spray can manufactured by a leading manufacturer of graffiti paints, namely the MOLOTOW® CoversAll2™ Outline Black high covering paint.

The tests were conducted following the same test protocol as the one used in Example 1.

The results for the plates made of stainless steel, glass, ceramic, concrete and a plastic material: PVC are respectively given on FIGS. 4 to 8.

The results for the plate made of painted steel are given in Example 1 and FIGS. 1 to 3.

It is seen that on all the ordinary, non-porous materials the gel efficiently removed the tag where it was applied i.e. on the right-hand half of the support.

Regarding porous surfaces such as concrete, removal was slightly less well-defined but can be improved by applying a second layer of gel or a greater gel thickness.

That is to say that, after removal of the flakes of the first gel layer, a second gel layer is applied. In other words, a second pass is carried out.

Example 3

In this example, the efficiency of the reference gel of Example 1 according to the invention was shown for the removal of graffiti made of three different commercially available paints, applied to cut out pieces made of painted steel.

These three paints were:
- the Molotow® high covering black paint described in Example 1;
- a paint from a pink paint spray can: Molotow® Premium Mad C psycho pink,
- a paint from a red fluo paint spray can: Luxens® red fluo spray paint.

The tests were conducted following the same test protocol as the one used in Example 1.

Photographs were taken at the different steps of the method and show the tagged substrate, the application of the gel, the completely dry gel, the removal of the flakes by brushing, and finally the condition of the substrate after light rinsing of the entire substrate.

It can be seen that irrespective of the paint used for the tag, the portion treated with the gel is returned to its original appearance after light rinsing.

It is to be noted that rinsing has no action on the paint non-treated with the gel, and is finally only necessary to remove the paint of the black tag that is more persistent than the other two pink and red fluo paints.

Example 4

In this example, eight gels according to the invention each containing a different solvent, active agent, were evaluated for their efficacy in removing a graffiti, tag, applied to test pieces of lacquered painted steel. The graffiti, tag, was a black paint from a tag spray can namely the MOLOTOW® CoversAll2™ Outline Black high covering paint (see Example 1).

The gels used in this example were mixtures of alumina (10 mass %) and of one of the solvents, active agents listed in Table 1 above (90 mass %).

These gels were prepared following the protocol described above.

The tests were conducted following the same test protocol as the one used in Example 1.

The results are given in FIGS. 9 to 16.

It is to be noted that the drying times observed may vary strongly as a function of conditions of use of the gel (temperature, gel thickness, ventilation . . . ).

The drying times indicated here were all observed under the same conditions and therefore allowed a comparison between the gels.

Photographs were taken which show the condition of the cut out piece of which the right-hand portion was treated with the gel under consideration, after removal of the gel flakes without rinsing.

Corresponding grey level (grey shade) profiles were determined from these photographs (FIGS. 9 to 16).

It can be seen that these solvents are relatively efficient on this type of paint, some drying more or less quickly and the gels being therefore more or less efficient.

More specifically:

the gel containing ethyl acetate dries very quickly (15-20 min) but nevertheless maintains excellent stripping efficiency (very few paint residues that are removed by mere rinsing);

the gel containing ethyl levulinate dries very slowly (2 to 3 days), but this extended contact time does not impart any greater stripping efficiency to this gel;

the gel containing acetylacetone dries over a time that is conventionally optimal for suctionable gels, i.e. 2 to 3 hours, and has a relatively good stripping power;

the gel containing methyl levulinate has a conventional drying time (2-3 h) and its stripping power is particularly good, this gel leaves few paint residues which are removed by rinsing with water. In addition, this solvent does not release an odour that is too strong and does not have any health risks since it is used in the agri-food industry. On the other hand, its price per liter remains little attractive;

the gel containing methyl acetoacetate is scarcely efficient since its stripping power is very low despite an extended contact (drying) time of 2 to 3 days;

the gel containing ethyl acetoacetate has a drying time of 2-3 days and is relatively efficient under the experimental conditions used for these tests;

the gel containing dimethyl succinate has a conventional drying time i.e. 2 to 3 h, and its stripping power is relatively good despite the presence of paint residues between the dry gel flakes;

the gel containing diethyl malonate has a drying time of about 24 h and it has relatively good stripping power despite the presence of paint residues between the dry gel flakes.

Example 5

In this example, the efficiency was evaluated of a gel according to the invention containing as active agent a mixture of solvents differing from the gel of Example 1, for the removal of graffitis.

It might be judicious in the gels of the invention to use mixtures of solvents as active stripping agent to extend the gel drying time and thereby increase its stripping efficiency, to limit solvent attack on plastics or to reduce the overall toxicity of the gel.

Thus, the reference gel of Example 1 was formulated with a mixture of ethyl acetate and diethyl malonate, since:

a gel with ethyl acetate alone is highly efficient in removing paint but it dries much too quickly (drying time about 15 to 30 minutes, cf. Example 4), without another solvent, in particular on porous materials, and it is finally less efficient;

a gel with diethyl malonate alone dries very slowly (within about 24 h, cf. Example 4) but it is less efficient than gelled ethyl acetate.

The mixture of these two solvents therefore allows a gel to be obtained having a reasonable drying time, namely 1 to 4 h.

A gel containing another solvent mixture was therefore prepared to evaluate its efficiency in removing graffitis.

This gel was a mixture of alumina (10 weight %) and of an active agent which was a solvent mixture (90 mass %) (80:20 by mass, ethyl acetate:methyl acetoacetate).

This gel was prepared following the protocol described above.

This gel was used to remove a graffiti, a tag, deposited on cut out pieces of lacquered painted steel. The graffiti, tag is made of a black paint, from a tag spray can namely the MOLOTOW® CoversAll2™ Outline Black high covering paint (see Example 1).

The tests were conducted following the same test protocol as the one used in Example 1.

The results for the gel that is a mixture of alumina (10 mass %) and of an active agent that is a solvent mixture (90 mass %) (80:20 by mass, ethyl acetate:methyl acetoacetate) are given in FIG. 17.

The results for the reference gel of Example 1 are given in FIGS. 1 to 3.

It can clearly be seen that the active agent mixture tested in Example 1 (FIGS. 1 to 3) is better than the one tested in this Example 5, since the tag was more efficiently removed with the solvent combination of the gel in Example 1 than with the combination in this Example 5.

Example 6

In this example, the anti-graffiti gels according to the invention were used under real conditions i.e. the efficiency of the gels of the invention was evaluated for the removal of real, non-simulated graffiti, found on buildings, installations or civil engineering structures.

Two tests under real conditions were carried out.

The first test was conducted on graffitis, tags present on an electric transformer made of lacquered steel and on a concrete bridge pier.

The gel tested for removal of these graffitis was a gel having as solvent, active agent, acetylacetone (89 mass %) in which alumina was incorporated (11 mass %).

This gel was prepared following the protocol described above.

The gel was applied with a spatula on different tags of different colours and of different paint textures.

The results of this first test in situ are given in FIGS. 18A and 18B (transformer) and on 19A and 19B (bridge pier).

The gel appears to have a relatively efficient action on these graffitis, tags, whether on the lacquered steel of the transformer (FIGS. 18A and 18B) or on the concrete of the bridge pier. However, since the gel was tested on very small surfaces with much wind (90 km/h), and the solvent additionally being very volatile, the action time of the gel was relatively short (no more than 15 to 30 minutes) and its efficacy was less obvious than in the second test conducted.

The second test was conducted with the reference gel described in Example 1, which has a longer drying time and is therefore more adapted to outdoor real tests. The gel was sprayed onto tagged buildings using a Wagner® paint spray (electrical gun W670). The targets were graffiti on a painted steel door (not enamelled). After removal of the dry gel flakes using an industrial vacuum cleaner, the treated surfaces were lightly rinsed without brushing to remove the residual traces of paint.

The results of this second test are given in FIGS. 20A and 20B.

The invention claimed is:

1. A method of removing graffiti on a surface of a solid substrate, wherein at least one cycle is performed comprising the following successive steps:
   a) applying a gel to graffiti on the surface of a substrate, said gel consisting of a colloidal solution, said colloidal solution consisting of:
      0.1 to 30 mass % relative to the total mass of the gel of at least one inorganic viscosifying agent;
      70 to 99.9 mass % relative to the total mass of the gel of a mixture of ethyl acetate and diethyl malonate or a mixture of ethyl acetate and methyl acetoacetate;
      optionally, 0.1 to 2 mass % relative to the total mass of the gel of at least one surfactant;
      and, optionally, 0.01 to 10 mass % relative to the mass of the gel of at least one dye and/or at least one mineral pigment;
   b) removing the graffiti by maintaining the gel on the surface at least for a sufficient time so that the gel dries and forms a non-powdery, dry
   c) removing the dry solid residue from the surface of the solid substrate.

2. The method according to claim 1, wherein the substrate is a porous substrate.

3. The method according to claim 1, wherein the substrate is made of at least a material selected from the group consisting of metals and alloys; organic polymers; glasses; cementitious materials; plasters; bricks; tiles; raw earth or baked earth; natural or artificial stones; coats; glass fibre; fibrocements; asphalt; tar; slate; cellulose-based materials; and ceramics.

4. The method according to claim 1, wherein the graffiti comprises a paint, an ink or a mixture thereof.

5. The method according to claim 1, wherein the gel is applied to the surface in a proportion of 100 g to 2000 g of gel per m² of surface.

6. The method according to claim 1, wherein the gel is applied to the surface of the solid substrate by spraying, with a brush or a trowel.

7. The method according to claim 1, wherein during step b), drying of the gel takes place at a temperature of 1° C. to 50° C., and under relative humidity of 20% to 80%.

8. The method according to claim 1, wherein the gel is maintained on the surface for a time of 30 minutes to 72 hours.

9. The method according to claim 1, wherein the dry, solid residue is in the form of particles of a size from 1 to 10 mm.

10. The method according to claim 1, wherein the dry, solid residue is removed from the solid substrate by brushing and/or suction.

11. The method according to claim 1, wherein the cycle is repeated 1 to 10 times using the same gel for all the cycles or using different gels for one or more cycles.

12. The method according to claim 1, wherein the mixture of ethyl acetate and diethyl malonate, in mass proportions consists of 20% to 99% of ethyl acetate and 1% to 80% of diethyl malonate, and the mixture of ethyl acetate and methyl acetoacetate, in mass proportions, consists of 20% to 99% of ethyl acetate and 1% to 80% of methyl acetoacetate.

13. The method according to claim 1, wherein the inorganic viscosifying agent is selected from the group consisting of metal oxides, metalloid oxides, metal hydroxides, metalloid hydroxides, metal oxyhydroxides, metalloid oxyhydroxides, aluminosilicates, clays, and mixtures thereof.

14. The method according to claim 1, wherein the inorganic viscosifying agent is selected from the group consisting of pyrogenated silicas, precipitated silicas, hydrophilic silicas, hydrophobic silicas, acid silicas, basic silicas, and mixtures thereof.

15. The method according to claim 1, wherein the surfactant is selected from the group consisting of non-ionic surfactants and mixtures thereof.

16. The method according to claim 1, wherein the gel further consists of at least one of said mineral pigment.

17. The method according to claim 7, wherein during step b), the gel before complete drying is rewetted with a solvent.

18. The method according to claim 14, wherein the inorganic viscosifying agent consists of one or more alumina(s).

19. The method according to claim 18, wherein the alumina(s) represent 5 to 30 mass % relative to the total mass of the gel.

* * * * *

UNITED STATES PATENT AND TRADEMARK OFFICE
CERTIFICATE OF CORRECTION

PATENT NO. : 10,376,931 B2
APPLICATION NO. : 15/518891
DATED : August 13, 2019
INVENTOR(S) : Amelie Ludwig et al.

Page 1 of 1

It is certified that error appears in the above-identified patent and that said Letters Patent is hereby corrected as shown below:

In the Specification

Column 6, Line 4, "alio" should be -- alia --.

Column 12, Line 10, "alio" should be -- alia --.

Signed and Sealed this
Nineteenth Day of November, 2019

Andrei Iancu
*Director of the United States Patent and Trademark Office*